US006421879B1

(12) United States Patent
Grätz et al.

(10) Patent No.: US 6,421,879 B1
(45) Date of Patent: Jul. 23, 2002

(54) CLAMPING GRIP, ESPECIALLY FOR HANDLEBARS OF BICYCLES AND THE LIKE

(76) Inventors: Michael Grätz, Georg-Haindl-Strasse 24a, D-87447 Waltenhofen; Jo Klieber, Dammweg 1, D-83342 Tacherting, both of (DE)

( * ) Notice: Subject to any disclaimer, the term of this patent is extended or adjusted under 35 U.S.C. 154(b) by 0 days.

(21) Appl. No.: 09/601,719
(22) PCT Filed: Feb. 5, 1999
(86) PCT No.: PCT/EP99/00760
§ 371 (c)(1),
(2), (4) Date: Sep. 11, 2000
(87) PCT Pub. No.: WO99/39970
PCT Pub. Date: Aug. 12, 1999

(30) Foreign Application Priority Data

Feb. 5, 1998 (DE) .......................... 298 01 916

(51) Int. Cl.[7] ........................... A45C 13/22; A45C 13/28
(52) U.S. Cl. ...................... 16/422; 16/430; 16/DIG. 12
(58) Field of Search .................. 16/422, 430, DIG. 12; 15/145, 146; 482/49

(56) References Cited

U.S. PATENT DOCUMENTS

| 1,161,270 A | * | 11/1915 | Vance ............... 16/DIG. 12 X |
| 3,937,629 A | * | 2/1976 | Hamasaka ................ 74/551.8 |
| 3,981,043 A | * | 9/1976 | Curry .......................... 16/430 |
| 4,226,418 A | * | 10/1980 | Balfour ............. 16/DIG. 12 X |
| 4,308,762 A | * | 1/1982 | Jannard ...................... 16/430 |
| 4,381,579 A | * | 5/1983 | Rumpp ........................ 16/430 |
| 4,493,494 A | * | 1/1985 | Feagin, Jr. ......... 16/DIG. 12 X |
| 4,785,495 A | * | 11/1988 | Dellis .................... 74/551.9 X |
| 4,837,892 A | * | 6/1989 | Lo ........................ 16/DIG. 12 |
| 4,890,355 A | * | 1/1990 | Schulten ............ 16/DIG. 12 X |
| 4,964,192 A | * | 10/1990 | Marui ............... 16/DIG. 12 X |
| 5,139,358 A | * | 8/1992 | Kodama et al. .......... 16/421 X |
| 5,299,466 A | * | 4/1994 | Heilbron et al. ........... 74/502.2 |
| D366,015 S | * | 1/1996 | Mccormack ............... D12/114 |
| 5,487,709 A | * | 1/1996 | Froelich et al. ............... 482/46 |
| 5,626,058 A | * | 5/1997 | Karpowich et al. ........... 74/489 |
| 5,797,165 A | * | 8/1998 | Armbrust ........... 16/DIG. 12 X |
| 5,926,913 A | * | 7/1999 | Hernandez et al. ....... 74/554 X |
| 6,003,405 A | * | 12/1999 | Giard ........................ 74/551.3 |
| 6,035,742 A | * | 3/2000 | Hollingsworth et al. ... 74/551.9 |
| 6,098,493 A | * | 8/2000 | Cortes ....................... 74/551.8 |
| 6,183,400 B1 | * | 2/2001 | Pope ....................... 16/430 X |

FOREIGN PATENT DOCUMENTS

| FR | 394412 | 1/1909 |
| FR | 13763 | 6/1911 |
| FR | 2695901 | 3/1994 |
| FR | 2704198 | 10/1994 |

OTHER PUBLICATIONS

Derwent publication of French patent 2,704,198 English translation, 1994, Derwent–Week 199443.*

* cited by examiner

Primary Examiner—Lunne H. Browne
Assistant Examiner—Ernesto Garcia
(74) Attorney, Agent, or Firm—Pearne & Gordon LLP

(57) ABSTRACT

The present invention relates to a clamping grip with a sleeve particularly for use on bicycle handlebars or other similar contrivances.

20 Claims, 10 Drawing Sheets

CLAMPING GRIP, ESPECIALLY FOR HANDLEBARS OF BICYCLES AND THE LIKE

BACKGROUND OF THE INVENTION

Description

The present invention relates to a clamping grip which is especially suitable for use on bicycle handlebars. The coupling to bicycle handlebars is however not the only possible application; clamping grips of the type described herein can be used, for example, on motorcycles, ski and hiking poles, sports and fitness equipment or on other equipment which involves a grip. For the purpose of simplification, however, the present invention will be described in the following with reference to its use on bicycle handlebars, whereby this description is in no case to be perceived as a limitation of its application.

The handlebar of a bicycle is usually affixed at the front. Depending upon the type of bicycle and its scope of application, a handlebar can exhibit various forms, whereas its cross-section is usually cylindrical. Handlebar design ranges from a basically straight rod to the classic racing handlebar to many various curved or winged forms. Handlebars are usually made of metal, light metal or fiber-reinforced plastic.

Since handlebars are customarily made of a hard material of minimal flexibility, they are fitted with a grip or covering at the typical grip points for a user in order to grant the user a comfortable ride. Among the functions realized by said grips or coverings is a shock-absorbing or elastic function so that the unevenness of the road and other such effects such as vibrations and shocks which are transferred to the handlebars are only further transferred to the hands or arms of the user to a minimized extent.

Grips are known in the prior art which are slipped onto the ends of handlebars or handle tubes. Such grips are comprised of, for example, a flexible plastic material and are of essentially cylindrical form.

The inner diameter of the grips is typically somewhat smaller than the outer diameter of the handlebars to which they are fitted. When mounting such a grip, the user has to apply considerable force in slipping it over the ends of the handlebars, since these grips must be tightly affixed to the handlebars for safety reasons.

Because of this, the mounting as well as the removal of such grips is difficult and time-consuming; replacing a grip of this type becomes such an effort that it is only then replaced when the fitted grips are worn out or have deteriorated.

A disadvantage of the known prior art grips is that they can slacken due to factors of aging or environmental impact such as, for example, rain, snow, heat or cold; particularly under high stress, but not limited exclusively thereto, this slackening can lead to these grips loosening from the handlebars, respectively sliding off same, which entails a considerable safety hazard and high risk of injury.

Depending on the weather conditions and intended use, different various grips are better suited for a particular user. In weather conditions such as rain, snow, mud or fog, grips or grip coverings with a more pronounced profile are better suited than smoother ones. Far less profiled grips may meanwhile be favorable at, for instance, high outside temperatures.

Another disadvantage of the known grips is that the effort expended in mounting and removal is so high that the user will not change these grips daily in order to adapt accordingly to weather conditions.

Especially in the athletic, semi-professional or professional arena, such adapting of a grip to present conditions as they arise can be very advantageous.

It is therefore the task of the present invention to provide a clamping grip which meets the afore-mentioned requirements and which provides an especially reliable function with simple mounting and removal steps.

This task is solved in accordance with the present invention, including the preferred embodiments thereof.

SUMMARY OF THE INVENTION

The present invention provides a clamping grip with high functional safety and which is simple to interchange with other clamping grips.

A clamping grip according to the present invention comprises a sleeve with a first essentially cylindrical section which extends preferably in longitudinal elongation. A slot which extends at least over one longitudinal portion is disposed essentially parallel to the longitudinal axis of said first section of said sleeve.

The sleeve is essentially completely enclosed by a gripping device, which is preferably non-rotatable or fixedly connected to the sleeve.

The gripping device is preferably essentially completely enclosed by a grip covering.

Furthermore, the clamping grip according to the present invention comprises at least one fastening device having at least one clamping piece provided for affixing the sleeve onto the bar, handlebar, tube, etc. inserted into said sleeve.

Said at least one clamping piece of said at least one fastening device may be positioned in at least one first open position and at least one second clamping position. The width of the sleeve slot is greater in the open position than in the clamping position.

A clamping device is preferably arranged at an end area of the longitudinal section which also comprises the slot. However, the fastening device may also be disposed at any other point on the longitudinal section, respectively the sleeve.

The gripping device wrapped around the sleeve is preferably disposed with an anti-skid, respectively elastic material on its outer surface which the user grips. This enables the user a more secure grip and shields the user's hands from smaller shocks.

The clamping grip according to the present invention has many advantages.

A particular advantage of the clamping grip according to the present invention is that only one clamping piece must be provided in the fastening device in order to securely and reliably mount the inventive clamping grip onto the bar, tube or the like.

Surprisingly enough, tests have shown that a fastening device having only one clamping piece, for instance at an end of the sleeve, is sufficient to reduce the slot width of the overall slot and sleeve length such that a reliable clamping is achieved. The utilization of just one clamping piece in the clamping grip according to the present invention results in reduced surface area, volume and weight.

Nor do the user's grip positions have to be unnecessarily reduced by using only one fastening device with preferably only one clamping piece. It should however be pointed out that the inventive clamping grip may also make use of two, three or more fastening devices, each with two or more clamping pieces.

The user can adjust the clamping piece of the fastening device into a first open position and a second clamping position, etc., so that the mounting and removal, respectively exchanging of a clamping grip mounted on a bar or tube is very simple and does not require much effort.

This enables the user to very easily affix a different clamping grip which he would like to use onto his equipment, respectively device.

Thus the user is able to change his bicycle handlebar grips as often as he likes depending upon, for example, weather conditions or personal preference.

Such substitutions are not so simple with the known prior art grips.

It is therefore possible, for example, to make use of a clamping grip with a more pronounced profile which would preferably be used in winter, while different clamping grips, respectively clamping grips having different surface characteristics, can be used, for instance, in the event of rain, moisture, high and low outside temperatures, with or without gloves, etc. Such adaptability is especially advantageous.

A further advantage of such clamping grips is that regular bicycle maintenance and repair is simplified due to the simple mounting and removal steps associated with such clamping grips. It requires a lot of effort to remove and then remount conventional slip-on or stuck-on grips, for example when replacing handlebars or brake grips. Utilizing clamping grips according to the present invention, yields considerable advantages in this respect.

A further advantage of the present invention is that safety factors are increased in that by utilizing such a fastening device, a clamping grip of this type can be reliably and securely affixed to the handlebar or tube, etc., without said clamping grip loosening by itself accidentally due to influences of weather or temperature. At the same time, it must be pointed out that a check or adjustment of the clamping piece during the course of normal maintenance work is sensible and even necessary.

In order to prevent the prior art grips from loosening or sliding off from the handlebars, it is often the case that additional wire or adhesive is used to secure them to the handlebars. Despite this effort, a loosening over time cannot be completely prevented. With the clamping grip according to the present invention, it is not necessary to implement or undertake such additional fastening measures.

In a preferred embodiment of the present invention, the sleeve of the clamping grip is essentially composed of a solid material and composed at least partially of a metal or plastic. To reduce the weight, a light metal is preferable, particularly preferable is employing aluminum, or an aluminum or titanium alloy. The sleeve can, however, also be at least partially composed of, for example, fiber-reinforced plastic.

The use of such materials is particularly advantageous, since the total weight of the bicycle or sports equipment is increased only in low measure.

In a further preferred embodiment of the clamping grip according to the present invention, the gripping device at least partially encloses the slot in the sleeve, preferably completely. This is particular advantageous, since the inventive clamping grip then exposes no exterior corners or edges as inherent with a slot which would cause increased wear to, for instance, gloves or would increase the risk of injury.

In a preferred embodiment of all previously described configurations, at least a portion of the gripping device is cast, sprayed or glued onto the sleeve. This has the advantage that the gripping device is then tightly coupled with the sleeve.

In a further preferred embodiment of the present invention in accordance with all previously described configurations, openings are arranged on the sleeve having preferably circular cross-sections. Said openings can, however, also be of rectangular, square or any other shape in cross-section. Preferably, they are realized as cylindrical bores and have two or more sections of differing diameters.

Said openings or bores are arranged on the outer surface of said sleeve and preferably aligned somewhat perpendicular to an axis line of the sleeve. In the event that said openings have two or more sections of differing diameters, preferably the diameter section of smallest diameter is not the section comprising the smallest distance to the axis line, respectively symmetrical axis of the sleeve.

Preferably the arrangement is such that the opening fist exhibits, as viewed radially outwardly along the axis line of the sleeve, a diameter section of greater diameter than one of the following diameter sections.

Several openings are preferably distributed along the length and circumference of the sleeve.

The arrangement of several, respectively a plurality of openings is especially advantageous when, but not limited solely thereto, a grip sub-cover or grip covering is cast, respectively sprayed on, since a portion of the material employed penetrates into and essentially fills the sleeve opening completely. The form-fit connection thus achieved between the grip (sub-)cover and sleeve thereby generates a (rotationally) fixed connection which will withstand even great load.

In a preferred configuration of the present invention, at least a portion of the gripping device is at least partially composed of an elastic material, respectively a combination of materials. Feasible materials are, for example, rubber, natural or synthetic materials or fiber-reinforced plastic.

The gripping device is preferably at least partially, preferably essentially completely encased by a coating which is preferably composed of naturally grown or synthetically manufactured elastic material such as, for example, rubber, leather, sponge rubber or various synthetic materials, in order to grant the user an anti-skid grip.

In a preferred embodiment of all previously described embodiments and configurations of the clamping grip according to the present invention, the gripping device is essentially of cylindrical shape, whereby the outer or inner surface of said gripping device may exhibit a surface profile. The utilization of a profiled outer surface is especially advantageous, since the outer profile is preferably configured in such a way that the user is granted at ergonomic and secure grip even under circumstances of high load.

In a further preferred embodiment of the present invention, the fastening device comprises just one screwing device with just one screw as a clamping piece with the screw preferably having an Allen screw head. It is, however, also possible that the fastening device is disposed with a quick-clamping device, for example, an element such as used in so-called quick-clamping hubs in the field of bicycles. It is furthermore possible to secure the clamping grip via a rivet joint.

In a further preferred embodiment of the present invention, an extension is arranged on the sleeve, whereby an axis along the longitudinal progression of the extension is at an angle to an axis on the sleeve which is preferably between 30 and 145°, particularly preferably between 60 and 120° and most particularly between ca. 90±20°.

The extension can be realized in bicycles or the like, for example, as a so-called handlebar horn or "bar end," thus enabling additional grip positions for the user.

The handlebar horn, respectively extension, is thus preferably arranged at an approximate right angle to the sleeve of the clamping grip and can be manufactured as an integral unit together with the clamping grip, respectively sleeve.

It is, however, also possible that the extension is a separate component which is preferably non-rotatably securable to the sleeve.

When utilized on bicycle handlebars, the extension is usually arranged on the second end of the sleeve, whereas when mounting, the handlebars are inserted into the opposite first end of the sleeve.

The handlebars are preferably inserted through the sleeve's entire elongation and up to the extension.

In the case that the extension is realized as a separate component, said extension is likewise preferably provided with a fastening device to affix the extension on the sleeve and/or handlebar. Preferably, said fastening device will then be similarly implemented as the fastening device on the sleeve.

In a preferred embodiment of the present invention when utilizing a separate component as the extension, the sides of the extension which are arranged directly adjacent to the sleeve in the intended assembly, for example on a bicycle handlebar, have a surface profile. The second end of the sleeve, which on bicycles points away from the center of the handlebar and is aligned adjacent to the extension, has a correspondingly reversed surface profile. The intertwined engaged profile of the extension and the sleeve guarantees a non-rotatable connection between sleeve and extension.

When the extension is manufactured as an integral unit with the sleeve, respectively clamping grip, the clamping grip accordingly has a second elongated section as an extension adjacent the first section and an intermediate area, which preferably is curved, is arranged between said two sections such that an axis of the first cylindrical section is at an angle to an axis of the second section which is preferably between 45° and 135° and particularly preferably between 90±20°.

When utilizing a clamping grip in accordance with the present invention on a handlebar, especially on bicycles or the like, said slot in the intended assembly is preferably aligned, when seen from above, at the front of said of sleeve, meaning pointing away from the user or aligned downwards. The clamping piece of the fastening device is preferably aligned essentially perpendicular to the slot and a turning axis of the sleeve. In the previously described case where the sleeve slot when seen from above is aligned forward or downwards, a longitudinal axis of the clamping piece is then aligned horizontally or essentially vertically.

In all previously described embodiments, the clamping grip can be removed for replacement by releasing the fastening device.

Furthermore, it must be noted that an inventive clamping grip of the previously described configurations and types may also be employed on ski or hiking poles, a handlebar, or any other sport or fitness equipment and is thus also claimed herewith.

The extension can be manufactured as an integral unit with the sleeve; it is, however, possible that the extension is a separate component which can be rotationally fixed to the sleeve.

It is important to emphasize that a combining of the individual features according to the present invention is preferable in any desired combination. In particular, any feature combination disclosed in the various dependent claims are also preferred upon omission of one or several of said features. The invention is in particular not limited solely to the embodiments as described herewithin.

BRIEF DESCRIPTION OF THE DRAWINGS

Further advantages, characteristics and application possibilities of the present invention will now be specified in the following description of embodiments in connection with the drawings, which show:

FIG. 7d a further embodiment of the clamping grip according to the present invention in a side view;

FIG. 8 a side view of a section through the sleeve of a clamping grip according to the present invention in accordance with a further preferred embodiment;

FIG. 9b a plan view of the embodiment according to FIG. 9a;

DETAILED DESCRIPTION OF THE PREFERRED EMBODIMENTS OF THE INVENTION

A first embodiment of the present invention will now be described with reference to FIGS. 1–3.

Figure 1:
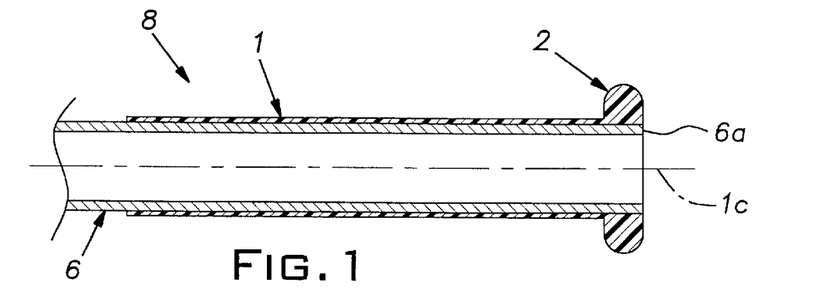
FIG. 1 a longitudinal section of a first embodiment of the clamping grip according to the present invention.

FIG. 1 shows clamping grip 8 in a longitudinal section. Sleeve 1 is slipped on handlebar end 6a, respectively tube 6, and has a slip guard 2 in the area of end 6a. Said slip guard 2 is of circular cross-section in the selected embodiment. Cylindrical sleeve 1 is symmetric to longitudinal axis line 1c.

Figure 2:
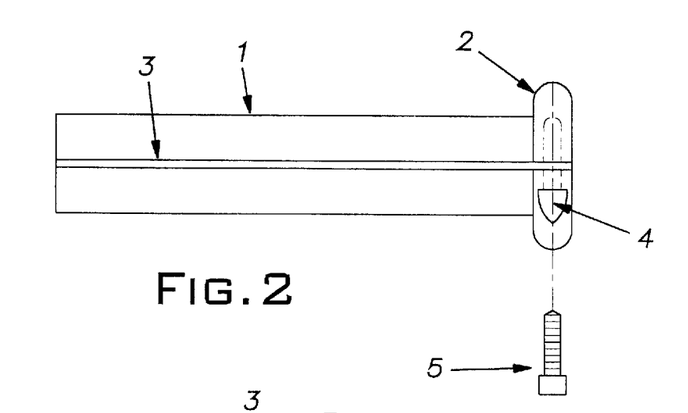
FIG. 2 a longitudinal view of the clamping grip in accordance with the embodiment according to FIG. 1.

FIG. 2 shows a longitudinal view of clamping grip 8. The slot, respectively clamping slot 3, is aligned parallel to axis line 1c of sleeve 1 and extends over the total length of sleeve 1.

Slip guard 2 is a semi-circular ring in cross-section which comprises a bore 4 which is essentially arranged perpendicular to axis line 1c, respectively the longitudinal extension of slot 3 and which serves to receive screw 5. Bore 4 has an internal thread and a section of greater diameter in order to receive the screw head of screw 5.

When mounting on a handlebar 6, clamping grip 8 is slipped on and clamped onto handlebar 6 by tightening screw 5 of clamping grip 8.

Surprisingly enough, tests have shown that one screw 5 at an end of sleeve 1 is sufficient to reduce the overall length of the slot width of slot 3 and attain a reliable clamping on handlebar 6.

Figure 3:
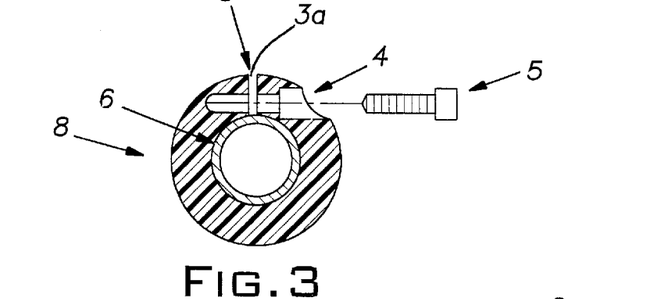
FIG. 3 a sectional side view of the clamping grip according to FIG. 1.

FIG. 3 is a sectional view of inventive clamping grip 8. When mounting, screw 5 is inserted into bore 4 and the slot width 3a of slot 3 is reduced by tightening screw 5.

Figure 4:
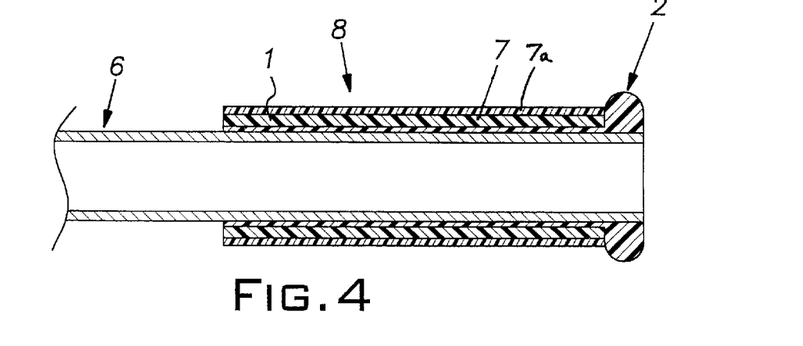
FIG. 4 a longitudinal section through a second embodiment according to the present invention.

FIG. 4 represents a second embodiment shown in longitudinal section, which is likewise slipped onto a handlebar 6. A slip guard 2 is arranged on the side. In contrast to the previous embodiment, a gripping device 7 is additionally provided in the present embodiment around sleeve 1 which is likewise of cylindrical shape. As shown in FIG. 4, gripping device 7 is preferably essentially completely enclosed by a grip covering 7a.

Figure 5A:
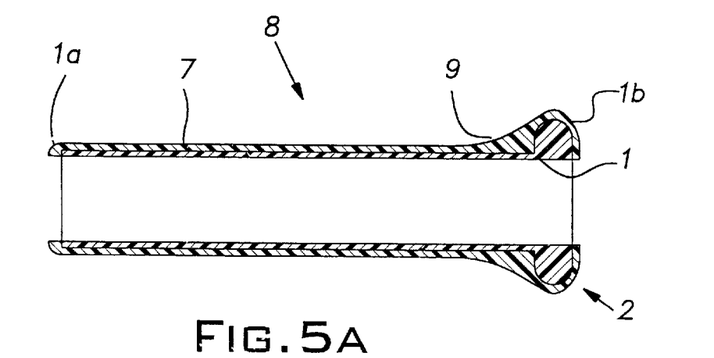
FIG. 5a a longitudinal view of a third embodiment of the clamping grip according to the present invention.

FIG. 5a shows a further embodiment of clamping grip 8, which likewise has a sleeve 1 and a gripping device 7.

During mounting, the first end 1a of sleeve 1 is slipped onto a handlebar or tube or other contrivance (not shown). At second end 1b of sleeve 1, a ring-shaped slip guard 2 is arranged which helps to prevent the user's hand from sliding off. A gripping device 7 encases sleeve 1 and slip guard 2 over the entire length of the clamping grip. In an area of slip guard 2 arranged at second end 1b of sleeve 1, gripping device 7 exhibits rounded portions which enables a rounded-off transition of gripping device 7 with sleeve second end 1b comprising slip guard 2.

Figure 5B:
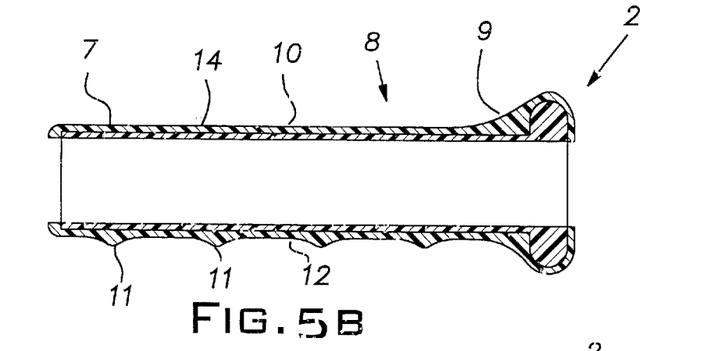
FIG. 5b a longitudinal view of a further embodiment of the present invention.

FIG. 5b shows a further embodiment of clamping grip 8, its gripping device 7 comprising a profiling in the lower section. The upper side of clamping grip 8 (orientation according to the alignment in FIG. 5b, respectively the intended mounting) exhibits a smooth covering 10, whereas recesses 12 are arranged between projections 11 on the underside.

In the selected embodiment, four recesses are arranged which serve to receive the user's fingers in the intended use of said clamping grip. Projections 11 disposed between recesses 12 prevent a lateral slipping of the user's hand.

Figure 5C:
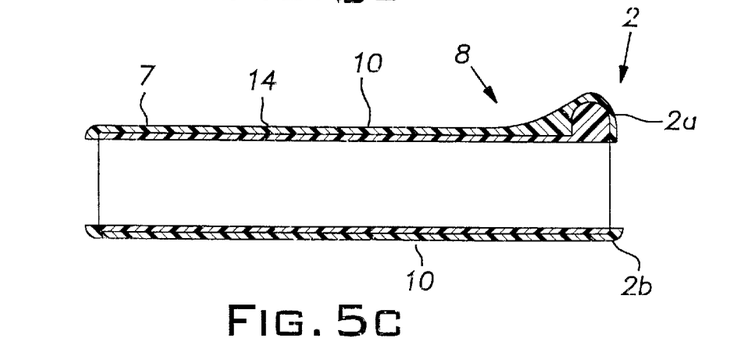
FIG. 5c a longitudinal view of a further embodiment of the clamping grip according to the present invention.

FIG. 5c shows a further embodiment of clamping grip 8, in which the slip guard 2 is arranged asymmetrically with respect to axis line 1c of sleeve 1. The upper section 2a of slip guard 2 has a height which corresponds to approximately half the diameter of sleeve 1 of clamping grip 8, whereas the slip guard in lower sections 2b is only slightly or not all elevated above the grip covering.

Figure 6A:
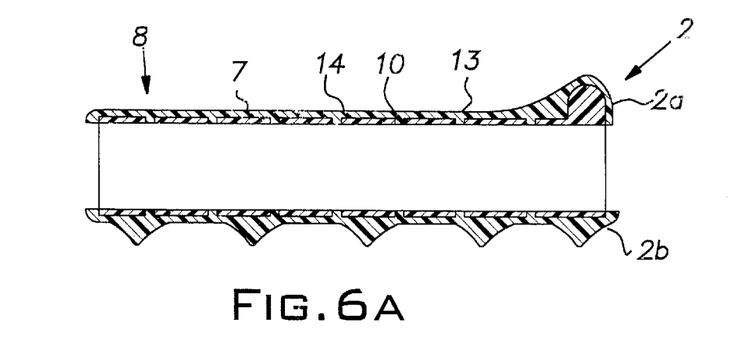
FIG. 6a a longitudinal view of an additional embodiment of the clamping grip according to the present invention.

FIG. 6a shows another embodiment of clamping grip 8 which comprises a smooth grip covering 10 on its upper side and profiling with alternating projections 11 and recesses 12 on its underside. In the previously described embodiment, slip guard 2 encompasses an upper section 2a which is of more pronounced configuration and a lower section 2b of less configuration, respectively none at all. Cavities 13a are arranged between bars 13b and gripping device 7. Said cavities 13a contribute a cushioning effect to gripping device 7 and result in a more comfortable use.

Figure 6B:
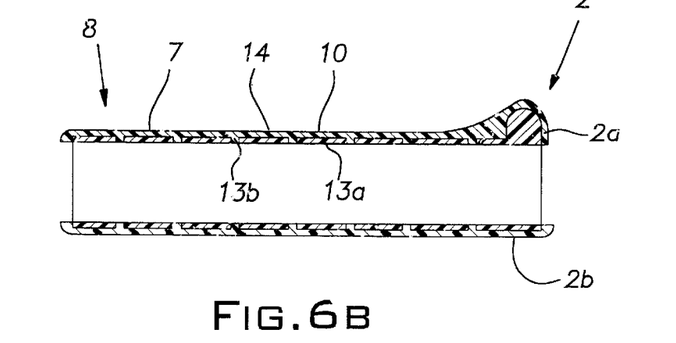
FIG. 6b a longitudinal view of an additional embodiment of the clamping grip according to the present invention.

FIG. 6b shows a further variant of clamping grip 8, which likewise comprises cavities 13a between bars 13b in its gripping device 7. In contrast to the previous examples, the gripping device 7 as realized here is configured as a smooth covering 10.

Figures 6C, 7A, 7B:
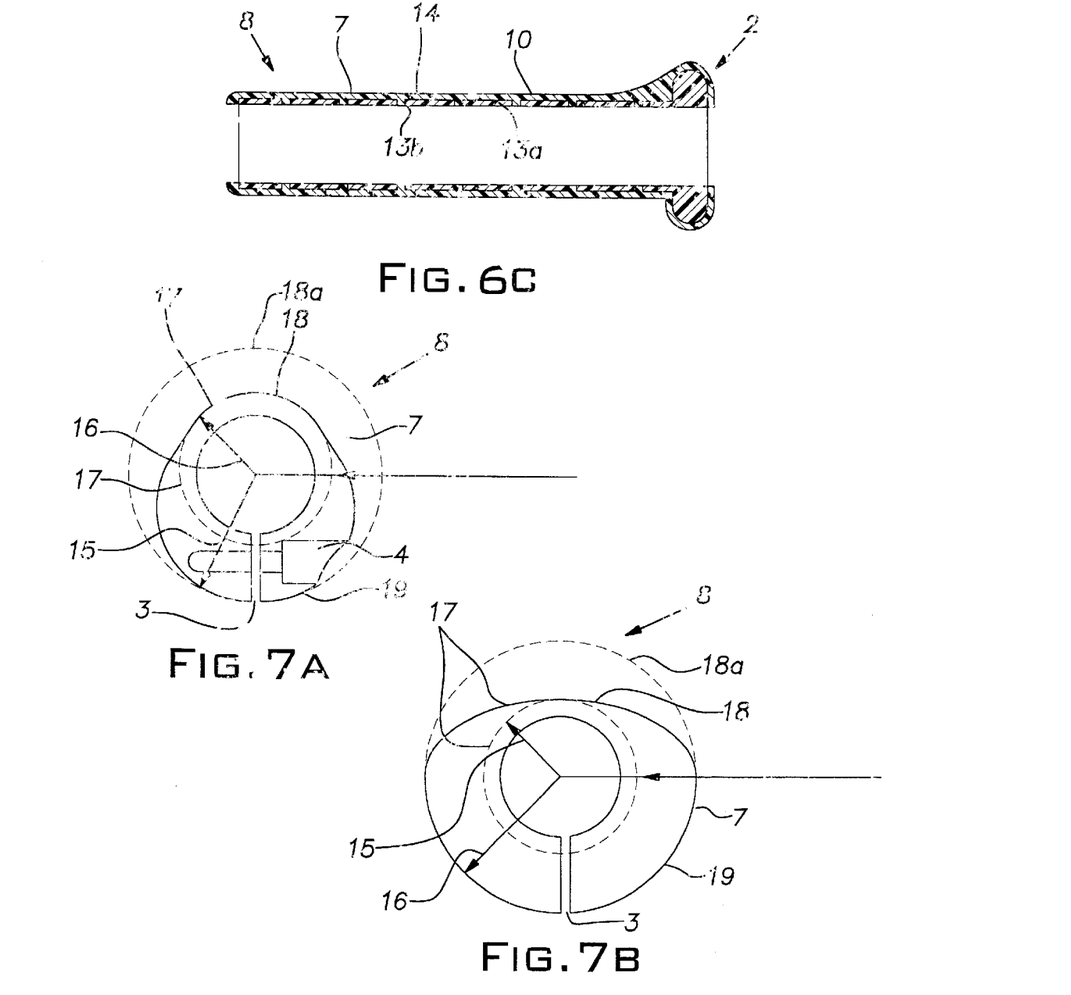
FIG. 6c a longitudinal view of an additional embodiment of the clamping grip according to the present invention.
FIG. 7a a side view of a further embodiment of the clamping grip according to the present invention.
FIG. 7b a further embodiment of the present invention in a side view.

FIG. 6c shows a further embodiment of inventive clamping grip 8, in which the slip guard 2 is essentially realized rotationally symmetrical to axis 1c of sleeve 1.

FIG. 7a shows a further embodiment of inventive clamping grip 8 in a side view. Gripping device 7 comprises a lower section IS of rounded-off configuration and a radius 16 of approximately 15 mm. In an upper section 19 of gripping device 7, the outer surface may be defined by a radius 15, here amounting to 25 mm. A circle having a radius 15 is represented by dashed circle 18a.

Clamping grip 8 has a bore 4 for receiving a screw (not shown), which acts upon slot 3 so that clamping grip 8 clamps onto a (handle) bar (not shown). A hand rest 17 serves to support the user's hands.

FIG. 7b represents a modified embodiment of the previously described embodiments, Lower section 18 of gripping device 7 in the present embodiment exhibits a flatter bearing. Radius 16 and radius 16 amount to 15 mm, respectively 25 mm, and thus correspond to the radii described in the embodiment according to FIG. 7a.

Figure 7C:
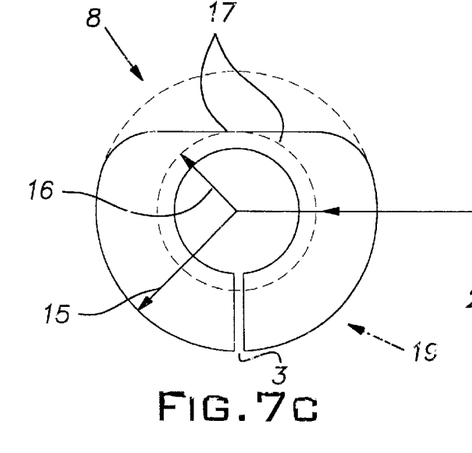
FIG. 7c a further embodiment of the clamping grip according to the present invention in a side view.

In the embodiment represented in FIG. 7c, hand rest 17 is of highly flattened form and upper section 19 is a circular segment realized with a radius 15 amounting to 25 mm.

Figures 7D, 8, 9B:
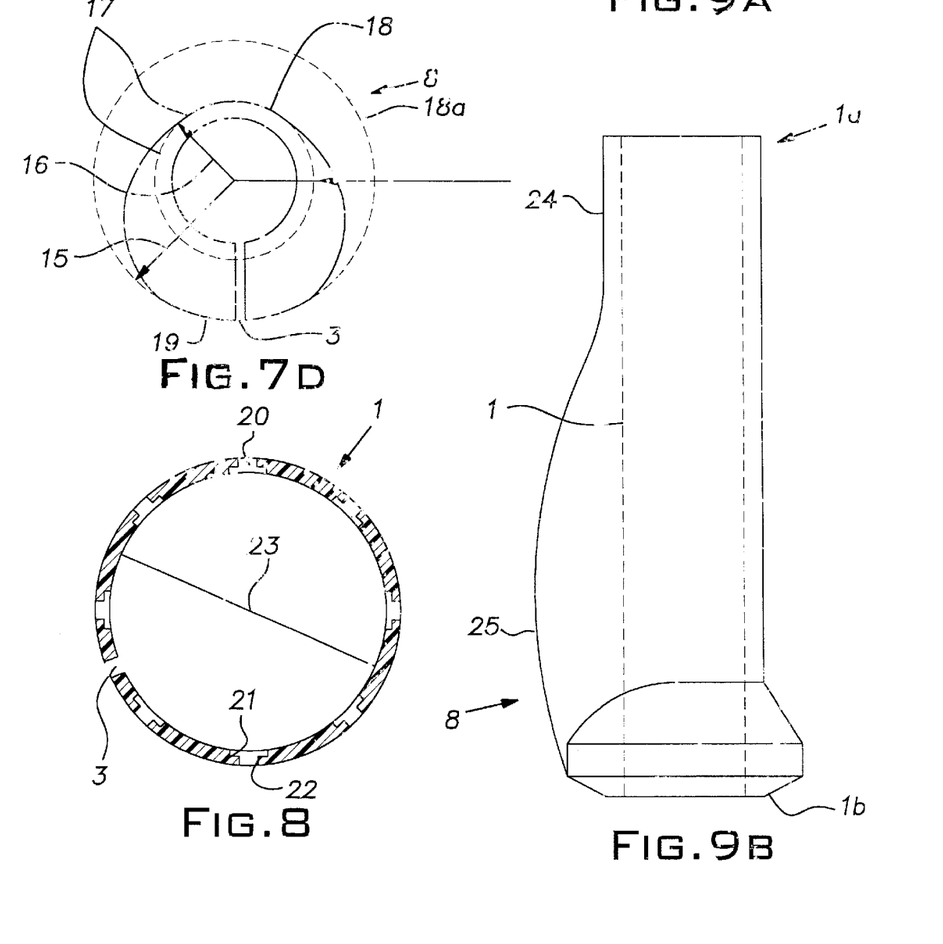

In the embodiment of FIG. 7d, hand test 17 is of rounded-off configuration.

FIG. 8 represents a cross-sectional view perpendicular to axis line 1c of sleeve 1. This configuration of sleeve 1 can be employed in all the previously embodiments.

Sleeve 1 has an inner diameter 23 which is somewhat greater than the bars, handlebars or tubes on which the clamping grip is to be mounted. A plurality of openings 20 (in the present embodiment, a total of 8) are distributed symmetrically over the circumference in the cylindrical wall of sleeve 1 and comprising two sections 21 and 22 of differing diameters. Diameter section 21 has a larger diameter than diameter section 22 of opening 20. Diameter section 21 is arranged on the inner circumference of sleeve 1 so that the diameter of opening 20 decreases from the inside toward the outside.

Gripping device 7 according to the previously described embodiments may be glued or cast onto sleeve 1. When utilizing a casting or spraying production process, a portion of the material employed for the gripping device penetrates openings 20 of sleeve 1, whereby a form-fit connection of gripping device 7 and sleeve 1 is created. As diameter 22 of opening 20 on the outer side of sleeve 1 is smaller than diameter 21 of opening 20 on the inner side of said sleeve, an especially reliable coupling of the gripping device with the sleeve is achieved.

Figure 9A:
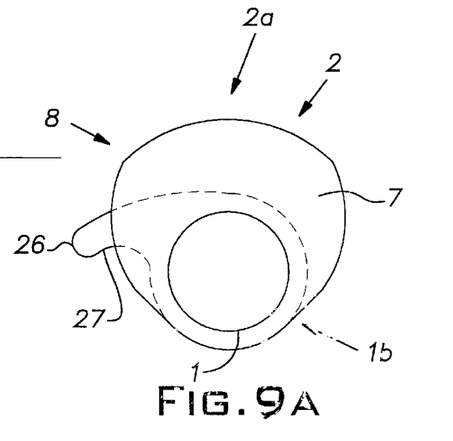
FIG. 9a a side view of a further embodiment in accordance with the present invention.

FIG. 9a shows a side view of clamping grip 8 in accordance with the present invention. The visible second end 1b of sleeve 1 has a slip guard 2 which encompasses an upper section 2a extending essentially longitudinally upwards.

FIG. 9b is a plan view of clamping grip 8 according to the embodiment represented in FIG. 9a showing a straight section 24 on a first end 1a of sleeve 1 and a curved section 25 in the central area of the sleeve. Curved section 25 is realized as projection 26 which is aligned essentially parallel to the road and forwards in its intended mounting on a bicycle. Curved section 25 in FIG. 9b is, in simple terms, realized as a horizontal plate in its cross-section, its horizontal length increases from first end 1a of sleeve 1 to a central area of the sleeve and then decreases again to the second end 1b of sleeve 1.

An ergonomically shaped bulge 27 is disposed on the underside of projection 26, the ergonomic shape providing the user's fingertips with a reliable and secure grip.

The upper side of projection 26 serves as a grip surface for the palm as the fingers wrap around projection 26.

Figure 10:
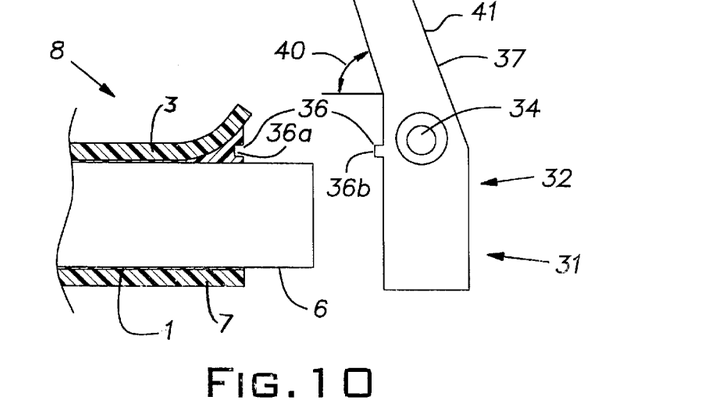
FIG. 10 a further embodiment of the present invention in a side view.
Figure 11:
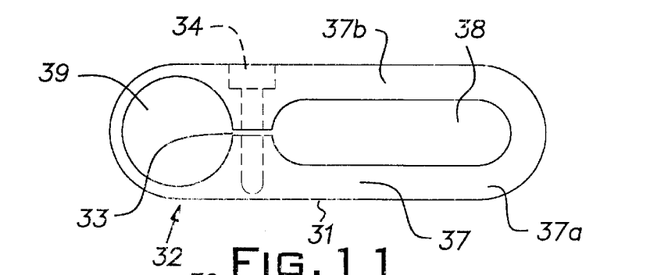
FIG. 11 a side view of the extension of the inventive clamping grip in accordance with the embodiment according to FIG. 10.

FIGS. 10 and 11 represent a further embodiment of the clamping grip according to the present invention which additionally comprises an extension, respectively handlebar horn 31. Handlebar horn 31 is realized as a separate component in the selected embodiment and comprises a fastening area 32. A cylindrical opening 39 is disposed in fastening area 32, whereby a slot 33 is arranged on a side of said cylindrical opening 39 and a bore 34 is disposed perpendicular to same for receiving a screw 35 in order to clamp said handlebar horn on a handlebar.

FIG. 10 shows a longitudinal view of clamping grip 8 comprising a sleeve 1.

In mounting, said handlebar horn 31 is slipped onto sleeve 1 and thus creates a form-fit connection 36 between handlebar horn 31 and sleeve 1. In addition, recesses 36a are arranged on sleeve 1 and projections 36b are arranged on handlebar horn 31 which in the intended assembly engage in a form-fit manner, thus ensuring a non-rotatable connection.

Said handlebar horn, respectively extension, comprises an extended section 41 having an angle of between 70 and 80° to axis line 1c.

The user can grip his hands around the longitudinally extending section 41 and same provides additional gripping positions.

FIG. 11 shows a side view of clamping grip 8 in accordance with the embodiment according to FIG. 10. Handlebar horn 31 comprises a fastening area 32 on an end in which opening 39 is arranged which serves for the receiving of a bar, handlebar or a tube. On the side of said opening 39 facing away from said first end, a slot 33 is disposed to which a bore 34 is aligned perpendicular for receiving a screw 35.

When mounting, a handlebar is inserted into opening 39, and by tightening screw 35 in bore 34, the slot width of slot 33 is reduced and thus the handlebar horn clamped onto the bar (not shown).

As seen to the right of the slot toward the second end of said handlebar horn, two arms 37a, 37b are arranged between which an opening 38, respectively an open volume, is provided. On said second end of said handlebar horn 31, both arms 37a, 37b approach each other in an arc and then merge with one other.

Opening 38 of extension 37 offers the advantage of a reduction in weight, since arms 37a, 37b ensure sufficient stability of the handlebar horn.

In the embodiment described with reference to FIG. 11, in the intended assembly on for example a bicycle handlebar, screw 35 is aligned essentially horizontal in the bore, respectively opening 34, parallel to the road surface and the screw head either points towards or away from the rider.

Figure 12:
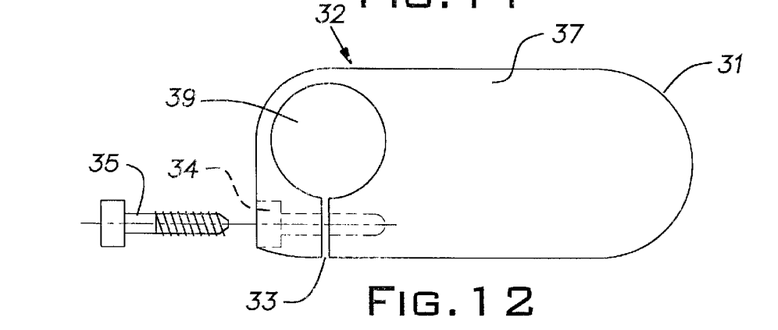
FIG. 12 a further variant of the extension of the clamping grip in accordance with the present invention according to FIG. 10.

FIG. 12 shows a further embodiment of handlebar horn 31 in a side view, in which extension 37 does not have an opening 38, but rather is of a solid material.

It should be noted that in all embodiments, clamping grip 8 and handlebar horn 31 may be encased by an additional grip covering.

A cylindrical opening 39 is disposed in a fastening area 32 which serves to secure the handlebar horns to the handles or the like.

In the intended assembly, for example on bicycle handles, extension 37 points essentially upwards and said first end of said extension has an opening 39 for receiving a handlebar or the like. A slot 33 is arranged adjacent opening 39, which in the intended assembly is aligned essentially horizontally, parallel to the bicycle plane and a bore 34 is disposed with a screw 35 in the area of the slot. The longitudinal axes of the screw and the bore are aligned essentially perpendicular to a longitudinal extension of the slot. By tightening screw 35 into bore 34, the slot width of slot 33 is reduced and the handlebar horn is fastened securely and reliably to the handlebar.

In the present embodiment, the intended assembly is such that the longitudinal axis of screw 34 with bore 35 is arranged essentially perpendicular with said handlebar horn and positioned preferably on the side of the handlebar horn aligned towards the use. It is however also possible in the intended assembly to realize handlebar horn 31 such that screw 35 is arranged horizontally from the user's viewpoint, in front of the handlebar.

Particularly advantageous with the clamping grip according to the present invention is that a mounted clamping grip can be interchanged with minimal effort. In so doing, the grip covering, clamping grip respectively, can be accordingly adapted to weather conditions or the user's personal preferences without having to sacrifice comfort or security.

Figure 13:
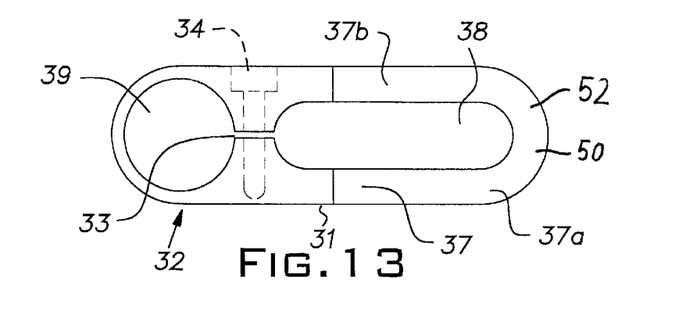
FIG. 13 an example of an embodiment of the present invention in a partial sectional view.

FIG. 13 shows a further embodiment example of a handlebar horn 31 which is preferably realized in isolation or in combination with other embodiments according to the present invention. The present handlebar horn 31 differs from the handlebar horn 31 represented in FIG. 11 particularly in that said handlebar horn is provided with a coating 52, respectively a protective cap, in the end section 50 facing away from the handlebars.

Figure 14:
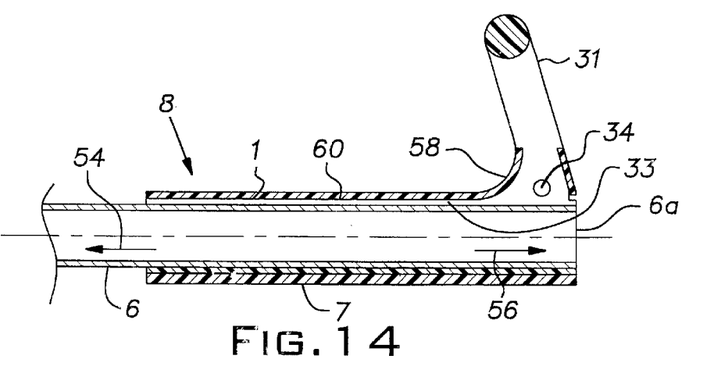
FIG. 14 an example of an embodiment of the present invention in a partial sectional view.

FIG. 14 shows a handlebar 6 with a mounted sleeve 1 which is formed integrally with a handlebar horn 31. In the slotted handlebar horn 31, a bore 34 is provided to receive a screw (not shown). By screwing in said screw—into a thread beyond the slot of the handlebar horn or into a nut (not shown)—sleeve 1 including horn 31 can be slipped over, respectively clamped onto handlebar 6.

It is preferable that, for example, the center of handlebar 6 is arranged toward arrow 54. Also preferred is that the center of the handlebar is arranged toward arrow 56.

Horns 31 can therefore be, in an embodiment example, positioned such on the handlebar that they are essentially arranged on the outer end(s) of the handle(s). Also preferred is that handlebar horn 31 is aligned towards the middle of handlebar 6 such that the area of sleeve 1 which serves as a gripping area and is concentrically arranged around handlebar 6, is disposed essentially on the outer ends of the handlebar. Also preferred is that transition area 58 between the handlebar horn 31 and the tubular area 60 of sleeve 1 is configured as an area of continuously increasing distance to axis 62 of the handlebar.

As an example, said area 58 has a radius which is greater than 1 cm, preferably greater than 2 cm, preferably greater than 3 cm. Thus it is also possible, for instance, to select a gripping position in which area 58 acts as a support area when gripping handlebar 6, respectively sleeve 1.

This then enables, for instance, more ergonomically favorable gripping positions.

Figures 15, 16:
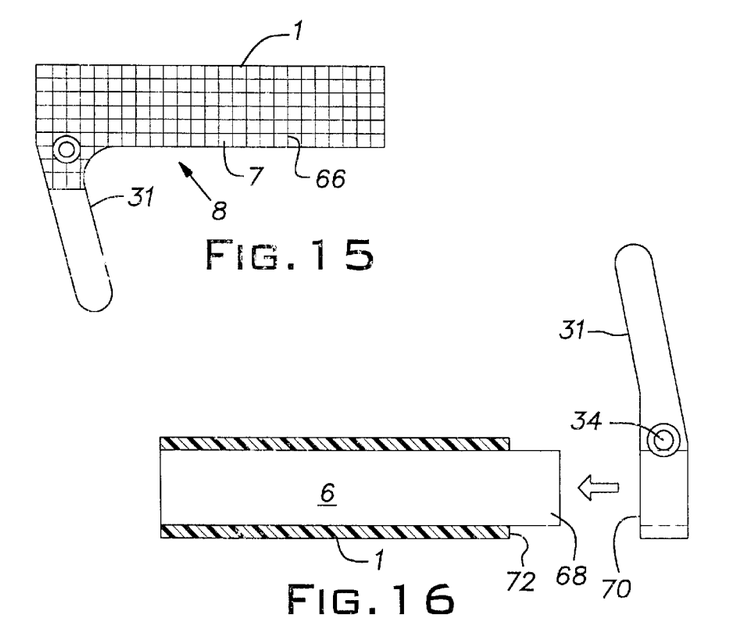
FIG. 15 an example of an embodiment of the present invention in a partial sectional view.
FIG. 16 an example of an embodiment of the present invention in a partial sectional view.

FIG. 15 shows a further embodiment example of the present invention in a partial sectional view. Here, surface area 64 of sleeve 1 is disposed at least partially with a fluting 66. A gripping device 7, for example, may be affixed or applied to said fluting 66. Said gripping device 7 positions at least partially in said fluting 66 so that it is granted a better mounted on sleeve 1. Gripping device 7 is, for instance, sprayed on. The unit comprising sleeve 1 including handlebar horn 31 as well as gripping device 7 can be completely removed from handlebar 6 upon releasing of the clamping.

FIG. 16 shows a further embodiment example of the present invention in a schematic, partial sectional view. Sleeve 1 encloses handlebar 6, while gripping device 7 partially extends around the sleeve. On the outer end 68 of handlebar 6, gripping device 7 yields another open area of sleeve 1 on which a handlebar horn 31, preferably in a slotted form with a bore 34, may be attached and braced.

For instance, a shoulder is disposed at end area 70 of handlebar horn 31 facing sleeve 1 such that in mounted state the handlebar horn is partially positioned around gripping device 7 so that gripping device 7 is braced along with handlebar horn 31 on handlebar 6, respectively sleeve 1.

It is likewise however also preferred that the handlebar horn in mounted state is simply positioned on the front side of gripping device 7 facing said horn.

Figure 17:
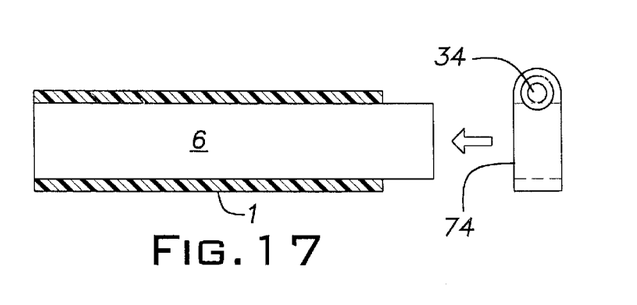
FIG. 17 an example of an embodiment of the present invention in a partial sectional view.

FIG. 17 shows a further exemplary, preferred embodiment of the present invention in a schematic view.

This embodiment basically corresponds to the embodiment according to FIG. 16 but differs in that instead of a horn 31 with an extension 37, a clamping element 74 is provided. Said clamping element 74 has an opening 34 for receiving a screw. Said clamping element 74 is slotted so that by screwing in the screw, said clamping element can be locked into position onto handlebar 6.

Figure 18:
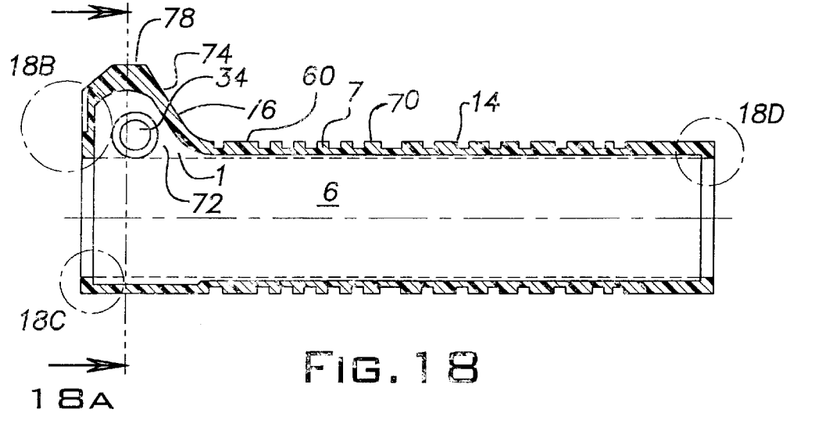
FIG. 18 an example of an embodiment of the present invention in a partial sectional view.

FIG. 18 shows a further exemplary embodiment of the present invention in a schematic diagram.

Sleeve 1 can be slipped over handlebar 6 and braced on the handlebar via one of the screws received in opening 34 so that a secure hold is provided. A gripping device 7, which shows at least a partial profiling 70, extends around the sleeve. It is particularly preferred that said profiling is disposed especially in grip area 14.

On at least one end of sleeve 1, preferably on that end of sleeve 1 which is not positioned at the end of the handlebar, and preferably in area 72 in which bore 74 is arranged, the sleeve comprises a support area 74.

Said support area 74 is thus preferably configured in such a way that the surface center of gravity of the sectioned areas is perpendicular to the sleeve axis in the section outside of said sleeve axis.

This essentially enables assuring support in the area where it is required. A user can therefore grip the sleeve partially across tubular area 60 of the sleeve and partially across support area 74. Support area 74 produces an altered grip position so that the user's hand joints are better protected due to the fact that the user is not forced to bend his hand joints in an ergonomically unfavorable way.

Support area 74 is, for example, configured as at least a partial bulge in the axis direction of the sleeve. It is preferred that the distance between surface 76 of support area 74 and axis 62 increases essentially continuously. The surface contour 76 is configured to progress, for example, round and/or angularly.

Figure 18A:
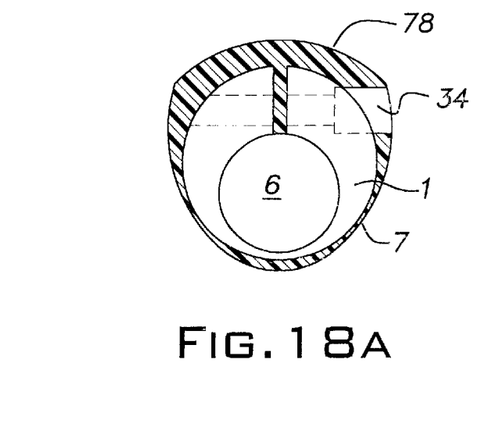
FIG. 18a a sectional representation along the XVIIIa—XVIIIa line from FIG. 18.

FIG. 18a shows a cross-section of sleeve 1 along the XVIIIa—XVIIIa line from FIG. 18 in an end section 78 which encompasses support area 74. The view which also shows the bore 34 for receiving a screw which locks sleeve 1 on handlebar 6, clearly shows that end section 78 with support area 74 receives handlebar 6 eccentrically.

Figure 18B:
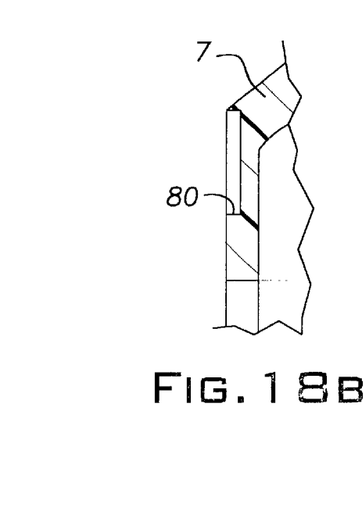
FIG. 18b an enlargement of detail A from FIG. 18.

FIG. 18b shows detail A from FIG. 18 in an enlarged view. In accordance with said embodiment example, a notch 80 is provided in said gripping device 7.

Figure 18C:
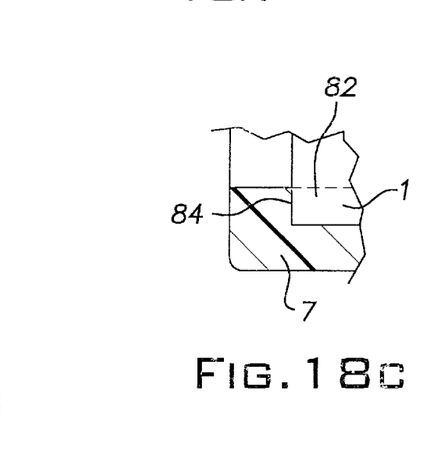
FIG. 18c an enlargement of detail B from FIG. 18.

FIG. 18c shows detail B from FIG. 18 in an enlarged view.

It is obvious from this detail that gripping device 7 is positioned around end section 82 on a first end 82 of sleeve 1 such that it covers the front face 84.

Figure 18D:
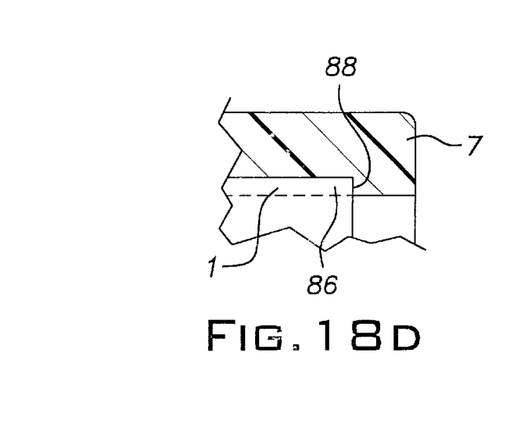
FIG. 18d an enlargement of detail C from FIG. 18.

Correspondingly, FIG. 18d represents detail C from FIG. 18, which clearly shows that gripping device 7 is also positioned around sleeve end 86 on a second end section 86 of sleeve 1 so that front face 88 arranged on sleeve end 86 is covered by friction coating.

Figure 19:
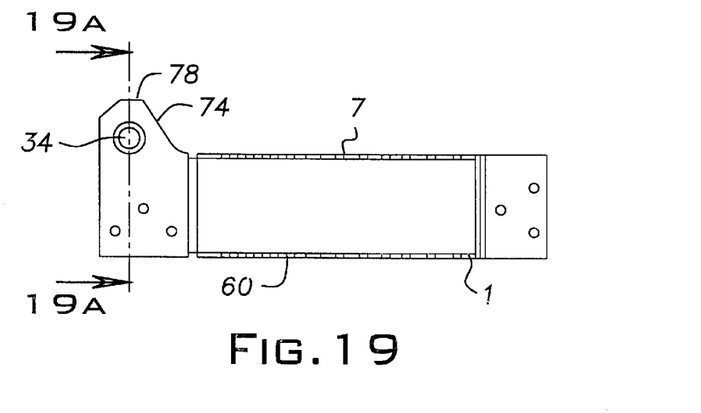
FIG. 19 an example of an embodiment of the present invention in a partial sectional view.

FIG. 19 shows a further embodiment example of the present invention in a schematic representation.

In accordance with the present embodiment example, a grip covering is disposed only over a portion of sleeve 1. In particular, a grip covering is provided in tubular area 60 of sleeve 1.

Figure 19A:
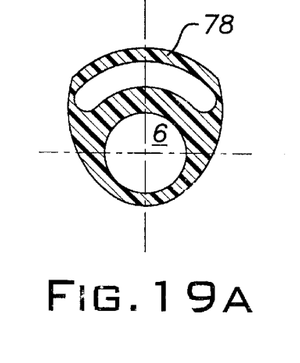
FIG. 19a a sectional representation along the XIXa line from FIG. 19.

FIG. 19*a* shows a cross-sectional representation along the XIXa—XIXa line from FIG. 19 in section 78.

Figure 20:
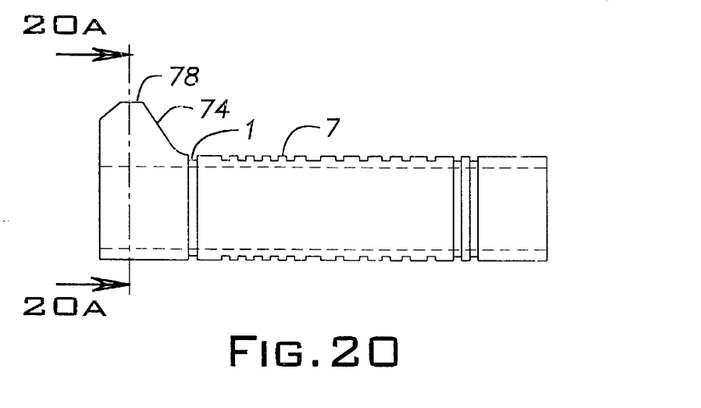
FIG. 20 an example of an embodiment of the present invention in a partial sectional view.

FIG. 20 shows an exemplary embodiment of the present invention which essentially corresponds to that according to FIG. 19. Here, gripping device 7 is realized as a fluted configuration.

Figure 20A:
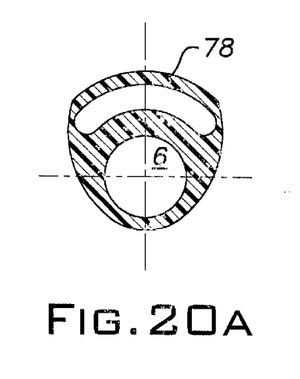
FIG. 20a a sectional representation along the XXa—XXa line from FIG. 20.

FIG. 20*a* shows a cross-sectional view along the XXa—XXa line from FIG. 20 in section 78.

Figure 20B:
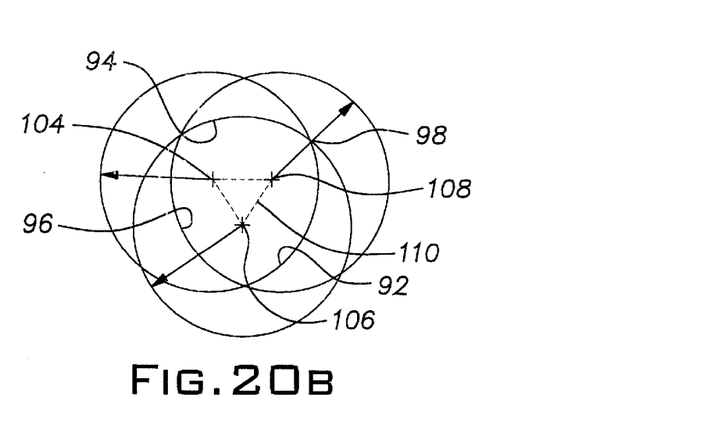
FIG. 20b a partial sectional view of FIG. 20a which illustrates an example of a surface contour.

FIG. 20*b* clearly shows, in an exemplary way, the surface contour of the cross-sectional view according to FIG. 20*a*.

The surface contour 90 is formed by three circular segments 90, 94, 96, which border one another in rounded-off transition areas 98, 100, 102. Circular segments 92, 94, 96 are positioned in such a way that each of their circular centers 104, 106, 108 are at a respectively different position.

Circular center 106 of second circular segment 94 lies preferably on the axis of handlebar 6.

Circular center 106 and circular centers 104, 108 together span a triangle, preferably an isosceles triangle, especially preferably an equilateral triangle 110.

Figures 21, 21A:
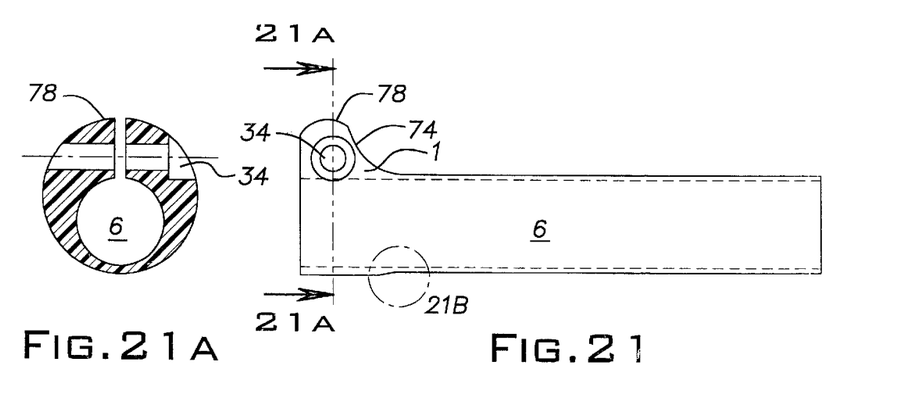
FIG. 21 an example of an embodiment of the present invention in a partial sectional view.
FIG. 21a a sectional representation along the XXIa—XXIa line from FIG. 21.

FIG. 21 shows a further exemplary embodiment of the present invention in a schematic view.

Sleeve 1 has a support area 74. In section 78, which comprises support area 74, a bore 34 is arranged to lock sleeve 1 on handlebar 6.

FIG. 21*a* shows a sectional view of section 78 at its thickest point.

FIG. 21*a* clearly shows that section 78 in this exemplary embodiment is circular.

Section 78 extends eccentrically around handlebar 6.

Figure 21B:
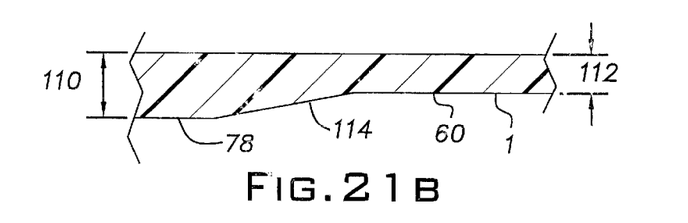
FIG. 21b an enlargement of detail D from FIG. 21.
Figure 22:
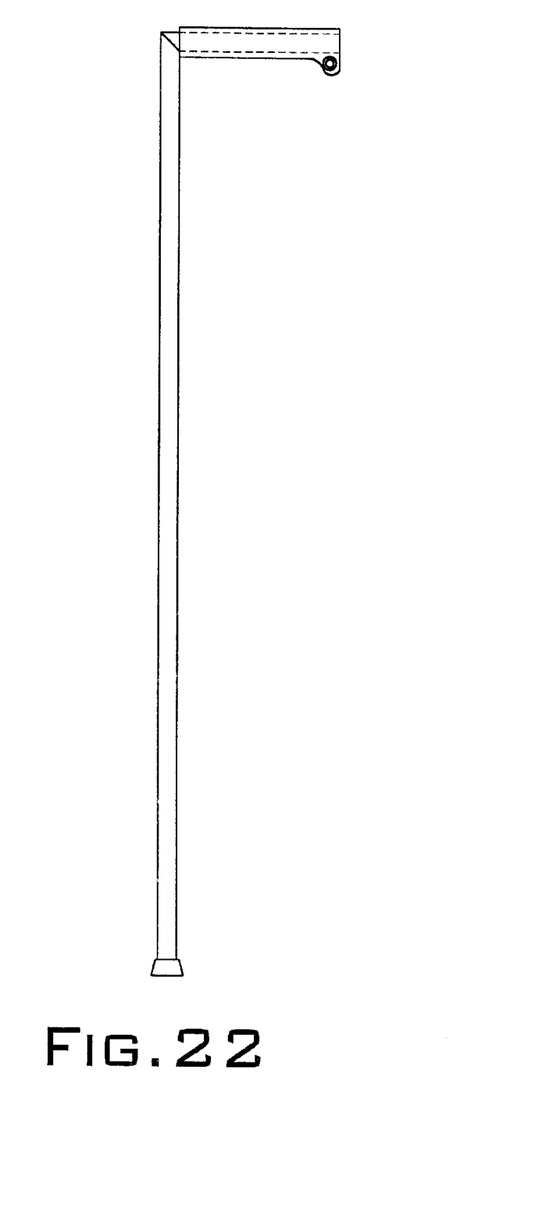
FIG. 22 a clamping grip according to the present invention mounted on a walking stick.
Figure 23:
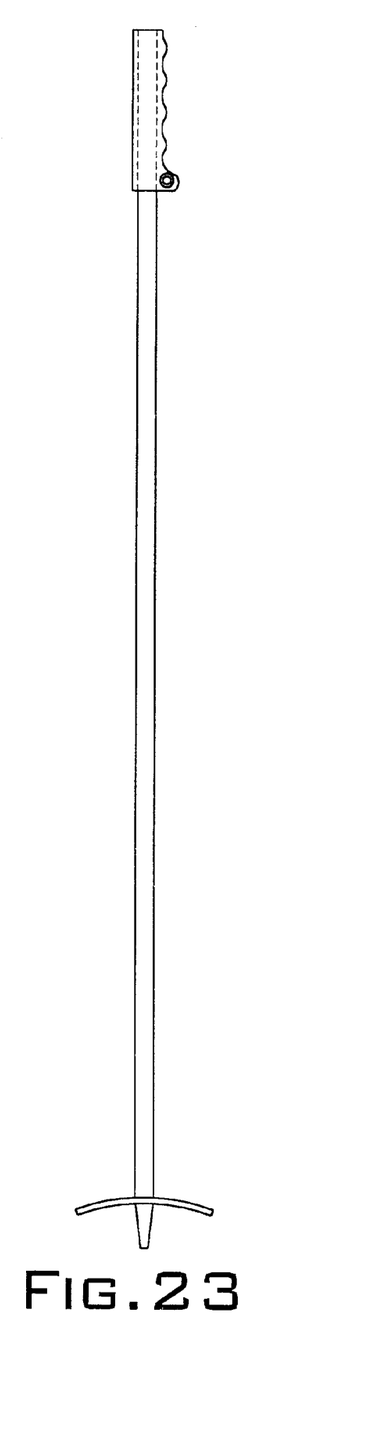
FIG. 23 a clamping grip according to the present invention mounted on a ski pole.
Figure 24:
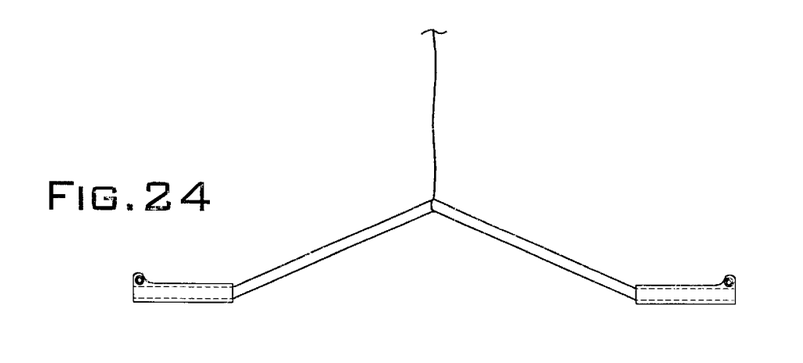
FIG. 24 a clamping grip according to the present invention mounted on sports or fitness equipment.
Figure 25:
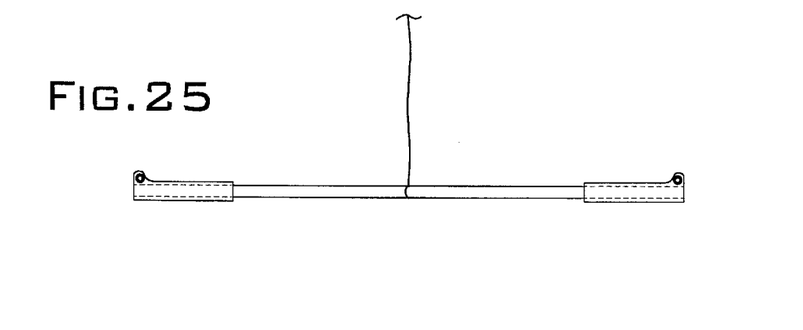
FIG. 25 a clamping grip according to the present invention mounted on sports or fitness equipment.

FIG. 21*b* shows an enlargement of detail D from FIG. 21.

FIG. 21 clearly shows that the wall thickness 110 in section 78 is greater relative the wall thickness 112 in the tubular area 60 of sleeve 1.

Transition area 114 between the sections having wall thickness 112 and wall thickness 110 is configured essentially without edges and/or breaches.

| Reference numerals | |
|---|---|
| 1 | sleeve |
| 1a | first end |
| 1b | second end |
| 1c | axis line |
| 2 | slip guard |
| 2a | upper section |
| 2b | lower section |
| 3 | slot |
| 3a | slot width |
| 4 | bore |
| 5 | screw |
| 6 | (handle-) bar, tube |
| 6a | handlebar end |
| 7 | grip covering |
| 8 | clamping grip |
| 9 | rounded portion |
| 10 | smooth covering |
| 11 | projection |
| 12 | recess |
| 13a | cavity |
| 13b | bar |
| 14 | grip area |
| 15 | radius R1 |
| 16 | radius R2 |
| 17 | hand rest |
| 18 | lower hand rest |
| 18a | circle |
| 19 | upper hand rest |
| 20 | opening |
| 21 | first opening area |
| 22 | second opening area |
| 23 | diameter |
| 24 | straight section |
| 25 | curved section |
| 26 | projection |
| 27 | bulge |
| 31 | handlebar horn |
| 32 | fastening area |
| 33 | slot |
| 34 | bore |
| 35 | screw |
| 36 | form-fit connection |
| 36a | recess |
| 36b | projection |
| 37 | extension |
| 37a | first arm |
| 37b | second arm |
| 38 | opening |
| 39 | opening |
| 40 | angle |
| 41 | section |
| 50 | end section |
| 52 | coating |
| 54 | arrow |
| 56 | arrow |
| 58 | transition area |
| 60 | tubular area |
| 62 | axis |
| 64 | surface area |
| 66 | fluting |
| 68 | outer end of 6 |
| 70 | end area of 31 |
| 70 | partial profiling |
| 72 | area |
| 74 | support area |
| 74 | clamping element |
| 76 | surface contour of 74 |
| 78 | end section |
| 82 | first end section |
| 84 | front face |
| 86 | sleeve end section |
| 88 | front face |
| 90 | surface contour |
| 90 | circular segment |
| 94 | circular segment |
| 96 | circular segment |
| 98 | transition area |
| 100 | transition area |
| 102 | transition area |
| 104 | circular center |
| 106 | circular center |
| 108 | circular center |
| 110 | isosceles/equilateral triangle |
| 110 | wall thickness |
| 112 | wall thickness |
| 114 | transition area |

What is claimed is:

1. Clamping grip comprising:

a sleeve with a first, essentially cylindrical section having a slot which extends over at least one longitudinal portion essentially parallel to a first longitudinal axis thereof, a gripping device enclosing the sleeve and covering said slot in said sleeve wherein said gripping device is non-rotatably affixed to said sleeve, at least one fastening device having at least one clamping piece for securing said sleeve to a bar, said at least one clamping piece of said at least one fastening device being positionable in at least one first open position and in one second clamping position, the slot width of said sleeve slot being greater in said open position than the slot width in said clamping position, and said sleeve having a second, essentially elongated section, and an intermediate area comprising a curve arranged between said first and said second sections, said first longitudinal axis of said first cylindrical section and a second longitudinal axis of said second, essentially elongated section, defining a non-right angle therebetween.

2. Clamping grip according to claim 1, characterized in that said sleeve is essentially composed of a solid material.

3. Clamping grip according to claim 1 characterized in that said gripping device is cast, sprayed or glued onto said sleeve.

4. Clamping grip according to claim 1, characterized in that said gripping device is at least partially composed of an elastic material such as rubber, sponge rubber, plastic or fiber-reinforced plastic.

5. Clamping grip according to claim 1 characterized in that said gripping device is essentially completely enclosed by a grip covering.

6. Clamping grip according to claim 1, characterized in that said gripping device is of essentially cylindrical form, and said gripping device or said sleeve has a bulge on at least one end section.

7. Clamping grip according to claim 1 characterized in that said fastening device is a screw device.

8. Clamping grip according to claim 1 characterized in that said fastening device is comprised of just one screwing device with just one screw as a clamping piece which preferably comprises an Allen screw head.

9. Clamping grip according to claim 1, characterized in that said essentially elongated section is manufactured as an integral unit together with said sleeve.

10. Clamping grip according to claim 1, characterized in that said essentially, elongated section is a separate component.

11. Clamping grip according to claim 1, characterized in that said clamping grip is mounted on a handlebar, and that said slot of said sleeve is in a predetermined position.

12. Clamping grip according to claim 1, characterized in that said clamping grip is mounted on a bar or handlebar, and is removable therefrom upon releasing of said fastening device.

13. Clamping grip according to claim 1, wherein said clamping grip is mounted on a ski pole or walking stick.

14. Clamping grip according to claim 1, wherein said clamping grip is mounted on sports or fitness equipment.

15. Clamping grip according to claim 2, wherein said solid material is selected from the group consisting of light metals, aluminum, aluminum alloys, titanium alloys and fiber-reinforced plastics.

16. Clamping grip according to claim 8, wherein said fastening device comprises an Allen screw head.

17. Clamping grip according to claim 10, wherein said essentially elongated section is non-rotatably secured to said sleeve.

18. Clamping grip according to claim 1, wherein said angle is between 45° and 135°.

19. Clamping grip according to claim 18, wherein said angle is between 70° and 110°.

20. Clamping grip according to claim 11, wherein said slot of said sleeve is aligned forward or downward relative to an axis of said handlebar.

* * * * *

UNITED STATES PATENT AND TRADEMARK OFFICE
CERTIFICATE OF CORRECTION

PATENT NO. : 6,421,879 B1
DATED : July 23, 2002
INVENTOR(S) : Grätz et al.

It is certified that error appears in the above-identified patent and that said Letters Patent is hereby corrected as shown below:

<u>Title page,</u>
Please delete "*Primary Examiner* - Lunne H. Browne" and insert therefor
-- *Primary Examiner* Lynne H. Browne --.

<u>Column 16,</u>
Line 7, please delete ",".

Signed and Sealed this

Fourteenth Day of January, 2003

JAMES E. ROGAN
*Director of the United States Patent and Trademark Office*